No. 783,302. PATENTED FEB. 21, 1905.
N. E. NORSTROM.
AUTOMATIC TELEPHONE EXCHANGE.
APPLICATION FILED APR. 10, 1900.

Witnesses:
Howard A. Redfield.
L. Elliott Brookes

Inventor:
N. Emel Norstrom
By Casper L. Redfield
Attorney.

Fig. 2.

No. 783,302. PATENTED FEB. 21, 1905.
N. E. NORSTROM.
AUTOMATIC TELEPHONE EXCHANGE.
APPLICATION FILED APR. 10, 1900.
10 SHEETS—SHEET 5.

Witnesses:
Howard A. Redfield
L. Elliott Brookes

Inventor:
N. Emel Norstrom
By Casper L. Redfield
Attorney.

No. 783,302. PATENTED FEB. 21, 1905.
N. E. NORSTROM.
AUTOMATIC TELEPHONE EXCHANGE.
APPLICATION FILED APR. 10, 1900.

Witnesses:
Howard A. Redfield
L. Elliott Brookes

Inventor:
N. Emel Norstrom
By Casper L. Redfield
Attorney.

No. 783,302. PATENTED FEB. 21, 1905.
N. E. NORSTROM.
AUTOMATIC TELEPHONE EXCHANGE.
APPLICATION FILED APR. 10, 1900.

Witnesses:
Howard A. Redfield.
E. H. Fritch.

Inventor
N. Emel Norstrom
By his Attorney
Casper L. Redfield

No. 783,302. PATENTED FEB. 21, 1905.
N. E. NORSTROM.
AUTOMATIC TELEPHONE EXCHANGE.
APPLICATION FILED APR. 10, 1900.

Witnesses:
Howard A. Redfield
L. Elliott Brookes

Inventor:
N. Emel Norstrom
By Casper L. Redfield
Attorney.

No. 783,302.

Patented February 21, 1905.

UNITED STATES PATENT OFFICE.

NILS EMEL NORSTROM, OF JUNCTION CITY, KANSAS, ASSIGNOR TO JOHN ANDERSON, OF SALINA, AND M. E. RICHARDSON, OF STERLING, KANSAS.

AUTOMATIC TELEPHONE-EXCHANGE.

SPECIFICATION forming part of Letters Patent No. 783,302, dated February 21, 1905.

Application filed April 10, 1900. Serial No. 12,284.

*To all whom it may concern:*

Be it known that I, NILS EMEL NORSTROM, a citizen of the United States of America, and a resident of Junction City, county of Geary, and State of Kansas, have invented certain new and useful Improvements in Automatic Telephone-Exchanges, of which the following is a specification.

My invention relates to automatic telephone-exchanges, and has for its object improvements in devices by which a subscriber makes connection with any other subscriber without the intervention of an operator at the central office.

In the accompanying drawings.

Figure 1:
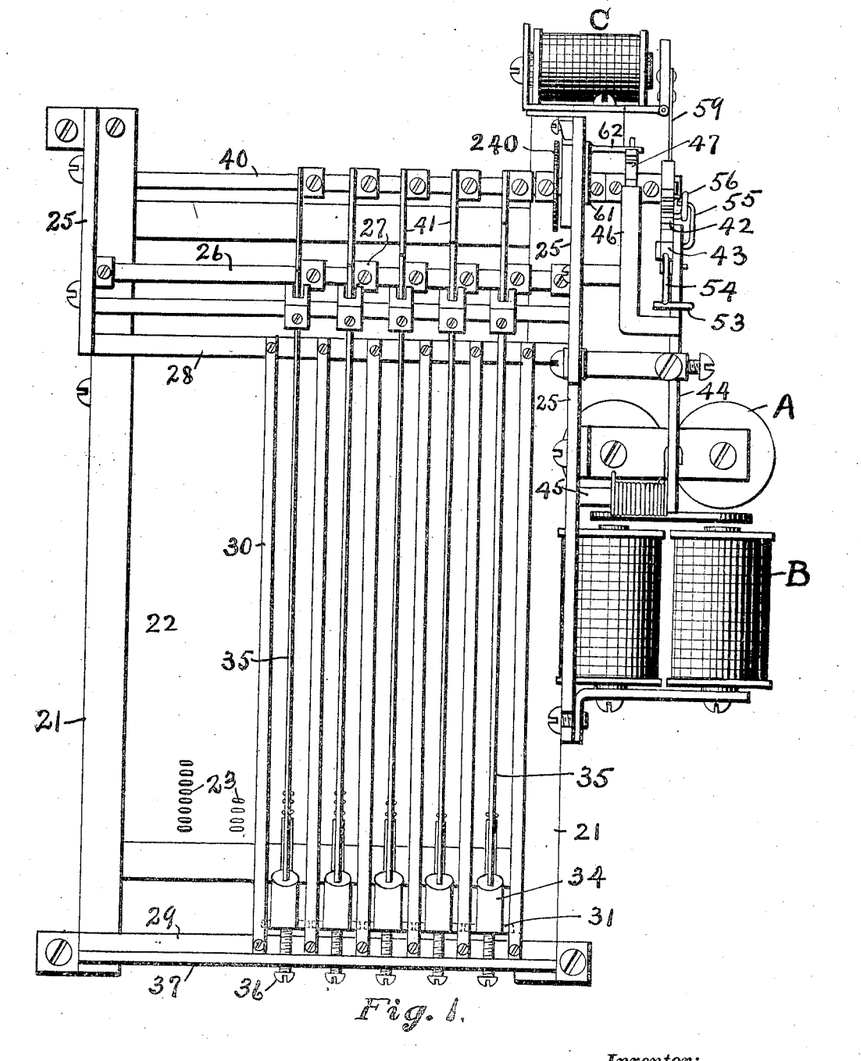
Figure 1 is a plan of one of the switches at the central office.
Figure 2:
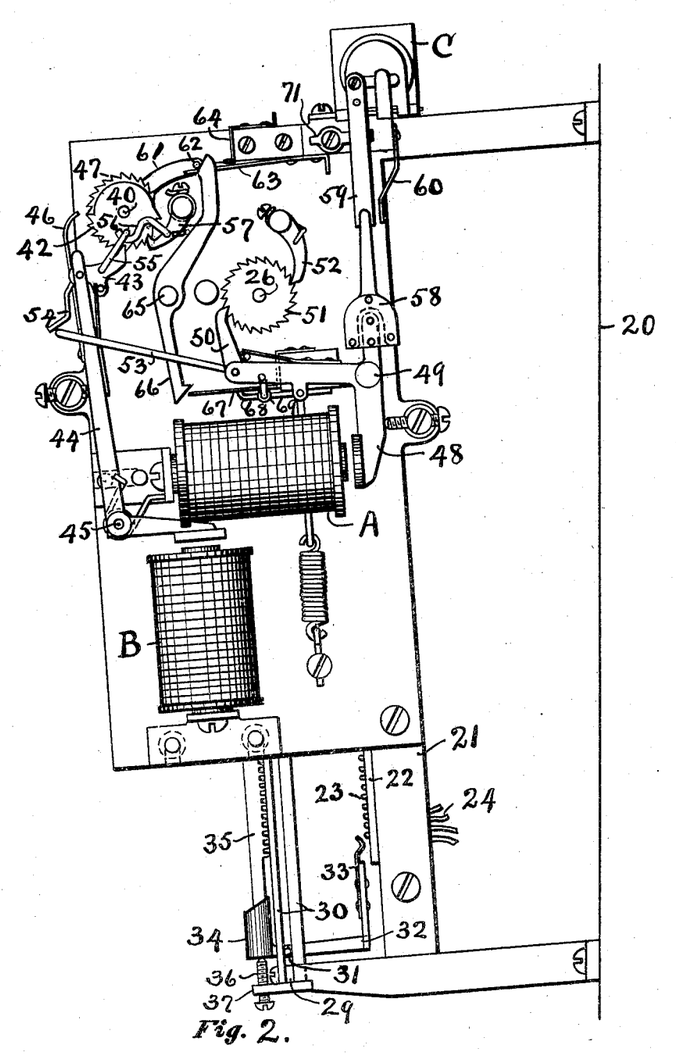
Fig. 2 is a side elevation of the same.
Figure 3:
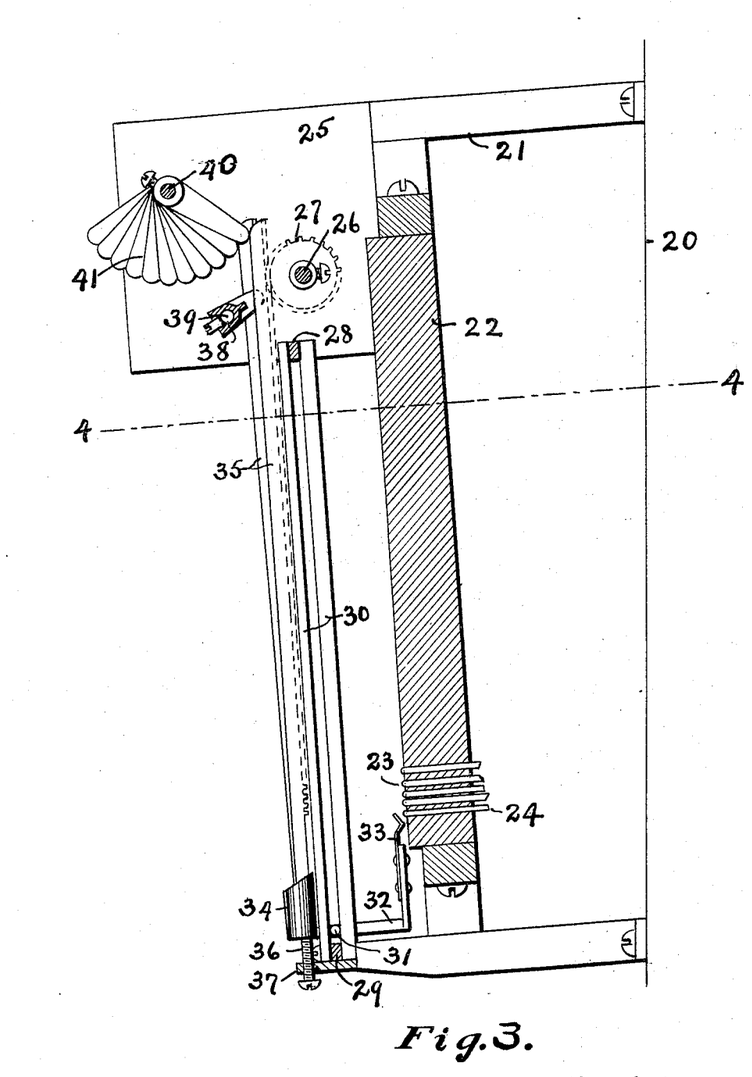
Fig. 3 is a longitudinal section showing the interior.
Figure 4:
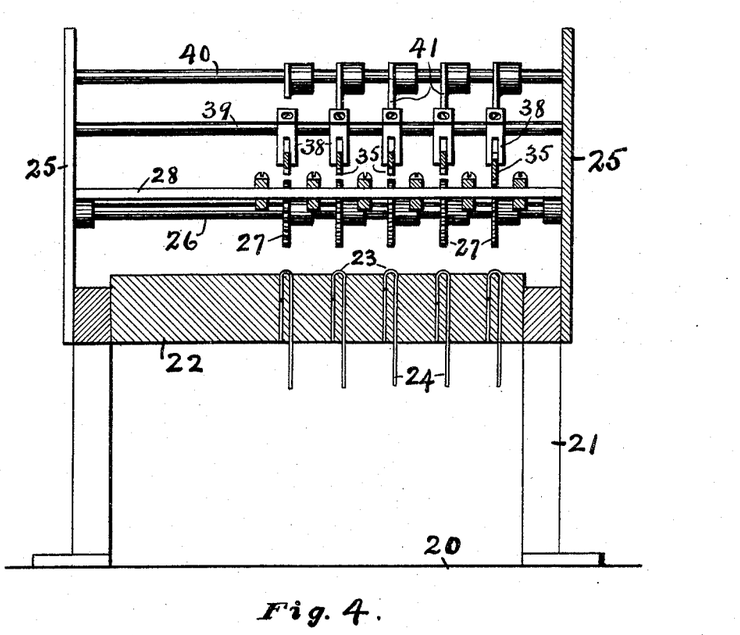
Fig. 4 is a transverse section on line 4 4 of Fig. 3, showing those parts between the side plates.
Figure 5:
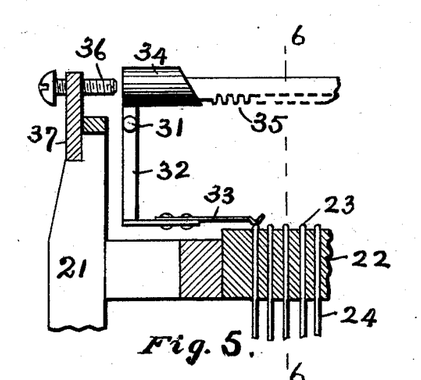
Fig. 5 is a detail somewhat similar to Fig. 3.
Figure 6:
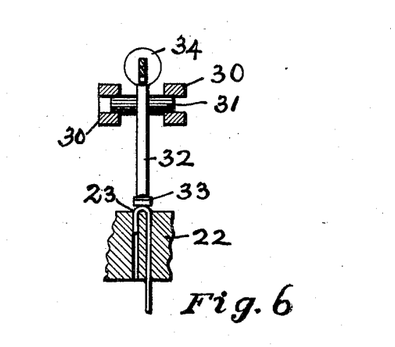
Fig. 6 is a transverse section on line 6 6 of Fig. 5.

In the said drawings, 20 represents a wall or face of a board to which is secured a frame 21, carrying a rectangular piece of insulation 22. On the front face of the insulation 22 are a series of rows of contact-points 23, which form the terminals of wires 24, which wires in the general diagrammatic view are represented by 301. Supported between the side plates 25 on the switch-frame 21 is a shaft 26, on which are a number of gears 27, which are in line with rows of contact-points 23. Also supported in the side plates 25 is a cross-bar 28 at the upper end of the switch, while at the lower end is a cross-bar 29, suitably supported on the frame 21. Carried on cross-bars 28 and 29 are a series of guides 30. In each pair of guides 30 is a cross-head or pin 31, on the back side of which is an arm 32, that carries a wiper or contact-making device 33, adapted to come in contact with contact-points 23. Secured to the opposite side of the cross-head 31 is a weight 34, attached to which is a rack 35, extending upward to a position opposite corresponding gear 27. The parts 31 to 35 are duplicated for each row of contact-points 23 and the corresponding gears 27. Normally the weights 34 rest against set-screws 36, which are adjustable in a bar 37 on the frame 21. By means of these set-screws the racks, and consequently the contact-making devices 33, are stopped in a downward movement at a desired position. Also supported between the side plates 25 is a shaft 39, on which are a number of guides 38, which hold the upper ends of the racks 35 in line with their respective gears. Also between the side plates 25 is a shaft 40, upon which are mounted a series of arms 41, each one of which is adapted to contact the upper end of a rack 35 and press it into contact or engagement with its correponding gear 27. The arms 41 are set at an angle to each other, so that when the shaft 40 is rotated only one rack 35 will be pushed into engagement with a gear 27 at a time, such engagement being released just before or approximately at the time when the next adjacent rack is pushed into such engagement by contact with the next adjacent arm 41. On the outer end of the shaft 40 is a ratchet-wheel 42, (see Fig. 2,) which is engaged by a pawl 43 on the end of a lever 44, which lever is pivoted at 45 to one of the side frames 25. The other end of the arm 44 carries an armature for magnet B, so that when said magnet is energized it will cause the ratchet-wheel 42, and consequently the shaft 40 and arms 41, to be rotated step by step. Also on the arm 44 is a pawl 46, adapted to engage another ratchet-wheel 47, which is also upon the shaft 40. The object of the pawl 46 and the ratchet-wheel 47 is to prevent the shaft 40 being rotated more than one tooth of the ratchet-wheel 42 at one impulse sent through the magnet B. Also located at a convenient place on the side frame 25 and not far from the magnet B is another magnet, A, which has an armature-lever 48 pivoted at 49 on the side frame 25. At the opposite end of the arm 48 is a pawl 50, adapted to engage a ratchet-wheel 51, secured on the outer end of the shaft 26. A holding-pawl 52 serves to prevent a backward movement of the ratchet-wheel 51. Also on the end of the lever 48 is an arm 53, which projects forward to engage a tailpiece 54 on the front of pawl 43. On the pawl 43 is a bent wire 55, which is adapted to engage another bent wire 56, that is secured to the holding-pawl 57, which holding-pawl engages the ratchet-wheel 42. These devices are so arranged that if the magnet A be first energized and while the current is still flowing through it the magnet B be also energized it will effect the release of the shaft 40 and permit the moved rack 35 to be released, so that it may fall back to its normal position by gravity. This release is effected in the following manner: Energizing-magnet A causes the arm 53 to engage the tailpiece 54, so as to move the pawl 43 away from the ratchet-wheel 42. While in this position if the magnet B be energized the bent wire 55 on the pawl 43 will engage the wire 56 on the holding-pawl 57, so as to push it also away from the ratchet-wheel 42, thereby releasing it. Secured to but insulated from the arm 48 is another arm, 58, which extends upward into line with a contact device 59, secured to the armature of the magnet C, which magnet is mounted on top of the frame 21. Adjacent to the contact 59 and the arm 58 is a contact-spring 60, which is engaged by the arm 58 when the magnet A is energized. Secured on the shaft 40 adjacent to the side frame 25 is an arm 61, provided with a pin 62, adapted to engage a spring 63, so as to push it out of contact with another contact device or spring, 64. This breaking of electrical connection between 63 and 64 occurs only when the shaft 40 is in its normal position. When the shaft 40 has been moved one step, so as to bring one of the arms 41 into contact with one of the racks 35, the pin 62 is moved away from the spring 63 and permits the said spring 63 to come into engagement with the contact-point 64. Pivoted at 65 on the side plate 25 is a lever 66, the lower end of which is provided with a hook adapted to engage a spring 67 when said spring has been raised from its normal position. Normally the spring 67 is in engagement with a contact 68, but is moved out of such engagement and caught by the hook on the lever 66 as soon as the magnet A has been energized. This movement is accomplished by means of a projection 69, carried on the arm 48, but insulated therefrom. Located behind the lever 48 is a contact-spring 70, which is shown in the general diagram. Whenever the magnet A is energized, the insulated portion 69 engages the contact-spring 70 for a purpose that will become apparent in a description of the circuits. Secured to but insulated from frame 21 is a contact-point 71, which is engaged by the armature-lever 59 when the magnet C is not energized; but such connection is broken when a current flows through said magnet C.

Figure 9:
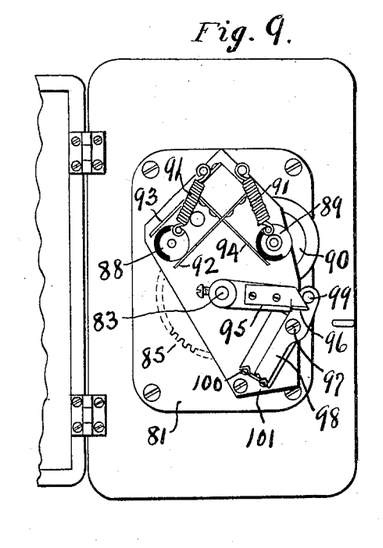
Fig. 9 is a view of the inside of the cover of the call-box.
Figure 10:
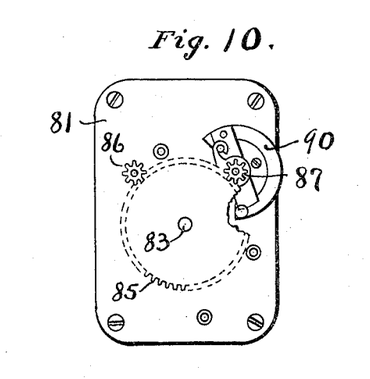
Fig. 10 is a view of the under part of the mechanism shown in Fig. 9.
Figure 11:
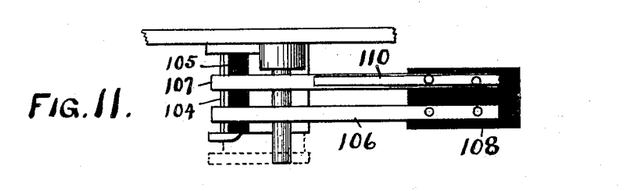
Fig. 11 is a plan of the contact devices near the receiver-hook.
Figure 12:
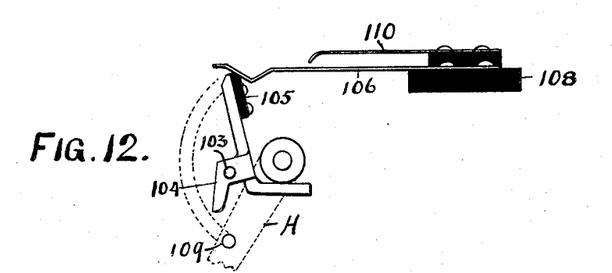
Fig. 12 is a side elevation of part of the contact devices adjacent to the receiver-hook and the mechanism for operating them.
Figure 13:
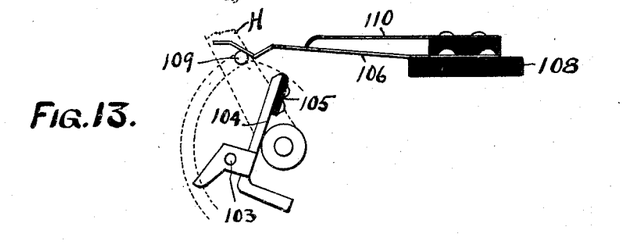
Fig. 13 shows the same parts in a different position.
Figure 14:
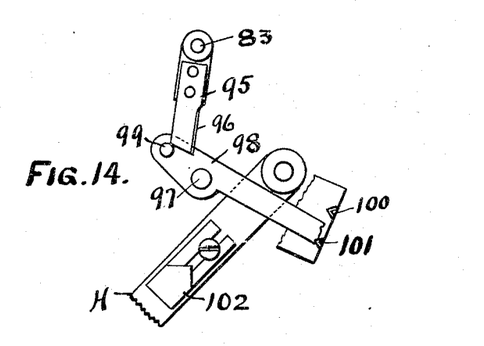
Fig. 14 is a diagrammatic view showing the coöperation between some of the parts shown in Fig. 8 and some of the parts shown in Fig. 9.
Figure 15:
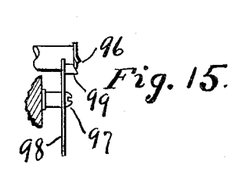
Fig. 15 is a detail of some of the parts shown in Fig. 9.

On the front of the telephone-box 80 is a plate 81, provided with a series of pins projecting slightly from its face and numbered consecutively from "0" to "9." These pins form a numbered dial by which the subscriber selects the required telephone. An arm or crank 82 is fitted on a spindle 83, located at the center of this dial. In the arm 82 is a key or feather 84, which projects below the lower side for convenience of stopping against one of the pins on the dial. On the inner side of the plate 81 and secured to the spindle 83 is a gear 85 in mesh with two pinions 86 and 87. Secured on the same spindle with the pinion 86 is a disk 88, and similarly secured to gear 87 is a disk 89. Part of the circumference of each of these disks is metallic and part insulating material, so that when they are rotated they make a series of electrical contacts. Also secured on the same spindle with a gear 87 is a governor 90 for preventing too rapid rotation of the contact-making devices 88 and 89. This governor may be of any required construction and is shown as a segment of a ring pivoted to an arm that is driven by gear 87, which segment may engage and press upon an interior disk when the motion is too rapid. Springs 91, connected to disks 88 and 89, serve as a tension to stop them in a required position, which position is that illustrated in Fig. 9. Supported at a convenient place is a contact-spring 92, which normally engages the metallic part of the disk 88, while another spring, 93, normally engages the insulating part of the same disk. Another spring, 94, similarly engages the disk 89 and normally is in contact with the insulating part. Also on the spindle 83 is an arm 95, to which is secured a piece of spring metal having its outer end beveled and partly turned up, as shown at 96 in Figs. 9 and 15. Pivoted at 97 is an arm 98, provided with a pin 99, that lies in the path of the arm 95. Near one end of the arm 98 are two contact-points 100 and 101. Normally the arm 98 is in contact with the contact-point 101; but when the spindle 83 is rotated in one direction the bevel on the outer end of the arm 95 engages the pin 99, so as to move the arm or lever 98 over into contact with the contact-point 100. If, however, the spindle 83 be rotated in an opposite direction, the turned-up edge 96 of the arm 95 will engage the bevel on the pin 99 and ride over said pin without moving the arm 98 out of engagement with the contact-point 101. Secured to the receiver-hook H is an adjustable block 102, so located that when the receiver-hook rises it will engage the pin 99 and move the lever 98 from contact 100 to contact 101. Pivoted at a point 103 adjacent to and behind the lever H is a small three-armed lever 104, which has on its upper arm a piece of insulation 105, adapted to come in contact with two spring-contacts 106 and 107, which are mounted upon a piece of insulation 108. On the inner side of the lever H is a pin 109, (see Figs. 12 and 13,) which is adapted to engage the under faces of the springs 106 and 107, so as to lift the latter into engagement with another spring-contact device 110 and also to move the lever 104 into the position shown in Fig. 13. When the lever H descends, it engages one of the lower arms of 104, so as to throw said lever back into the position shown in Fig. 12. While moving from the position shown in Fig. 13 to position shown in Fig. 12 the lever 104 engages the under side of spring 106 and spring 107, so as to make electrical connection between them for a brief period while passing from one position to another. Also mounted on the piece of insulation 108 is a contact-spring 111, adapted to be engaged by a rearward projection H' on the lever H when said lever is depressed. Also on block 108 are two other contact-making springs, 112 and 113, which are engaged by the lever H when it is in its elevated position.

Figure 16:
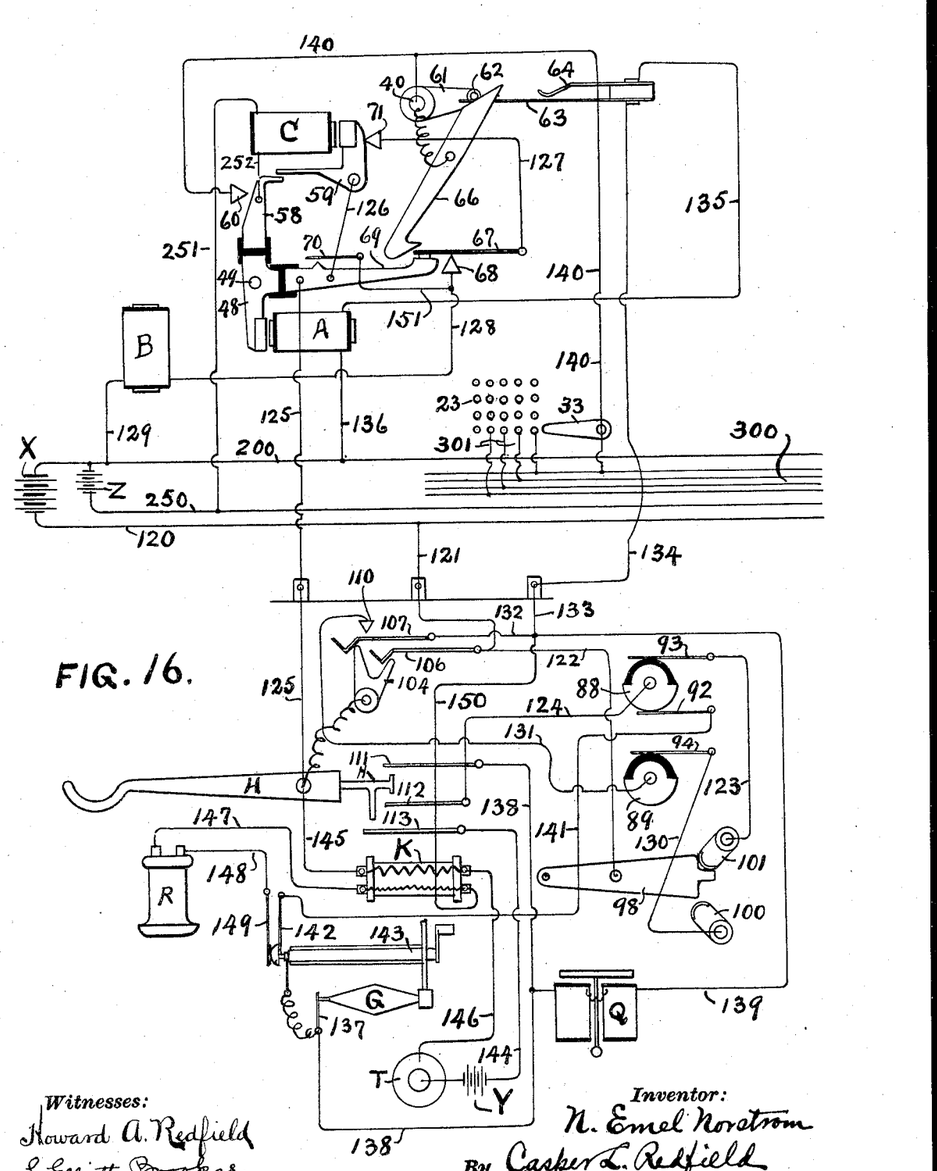
Figs. 16, 17, and 18 taken together are a general diagrammatic view showing three switches at the central office and their connected telephones, together with their electrical connections. This diagram also shows the mechanical operation diagrammatically and some of the parts at the switch and the telephone-box.
Figure 17:
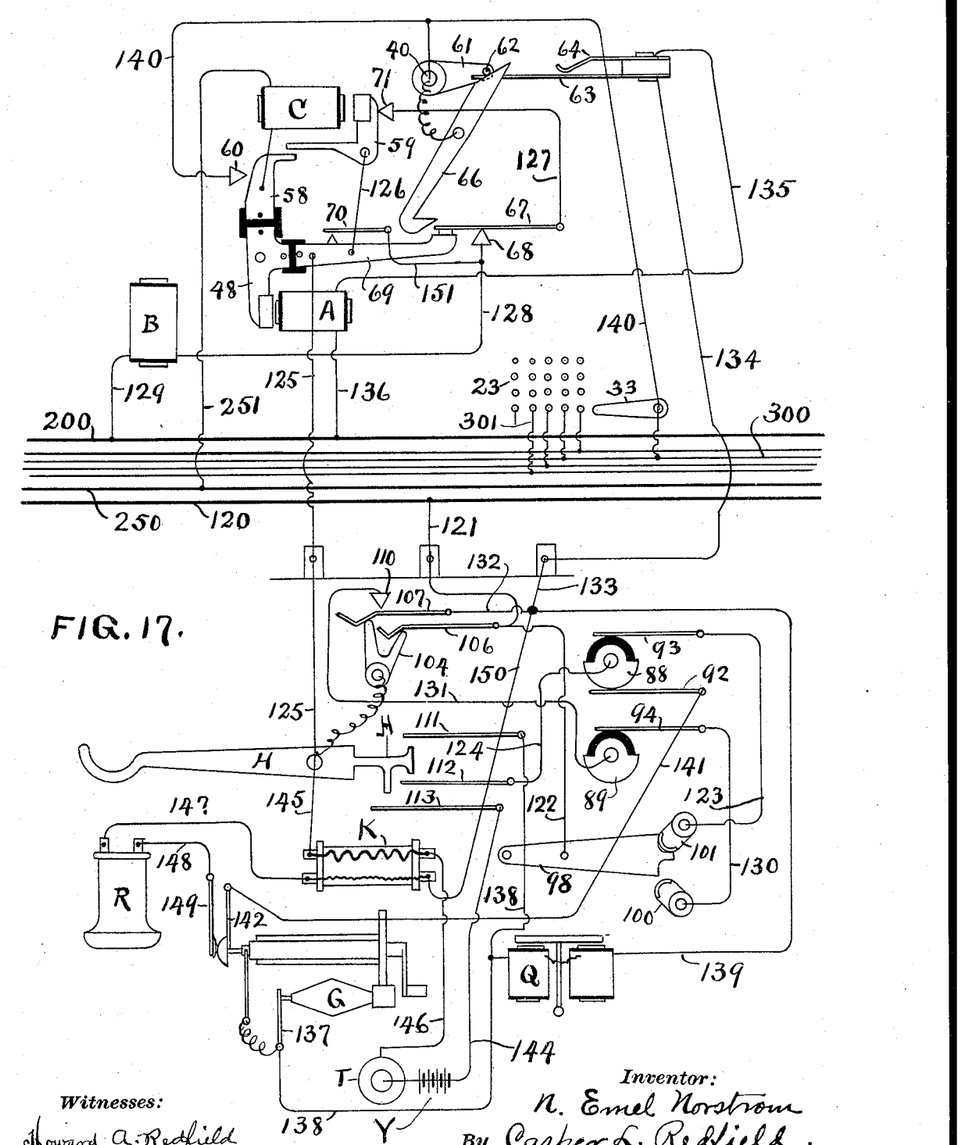
Figure 18:
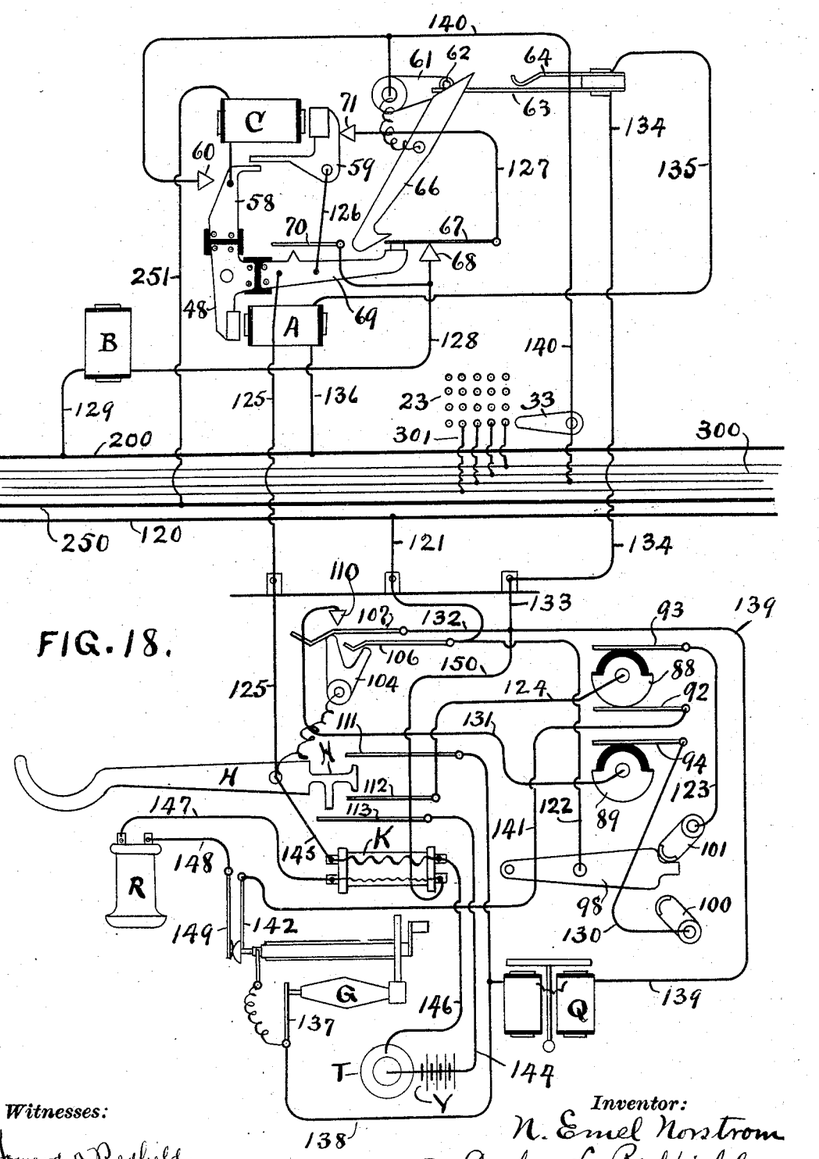

In carrying out my invention I place in a central office a series of switches, to each one of which is connected a telephone, and the switches and telephones are connected electrically to batteries and wires in the manner generally illustrated in the diagram made up of Figs. 16, 17, and 18. When a subscriber wishes to call another—as, for example, he wishes to call "456"—he first moves the crank 82 to the position "4" on the dial of his telephone-box. He then removes the receiver and turns the crank clockwise to its normal (which is its lower) position and then continues for five complete revolutions to normal and six indicating-points beyond. He then rings to call the subscriber, talks, and hangs up the receiver. These are the entire operations as far as the calling subscriber is concerned. The called subscriber merely removes his receiver, talks, and returns it.

Figure 7:
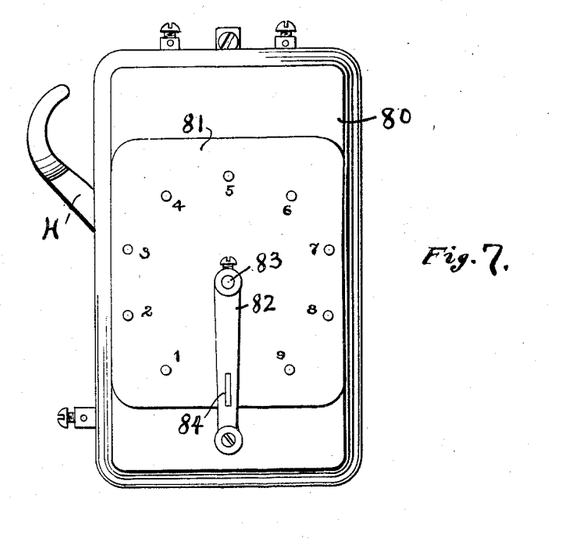
Fig. 7 is a front elevation of the call-box at the telephone.
Figure 8:
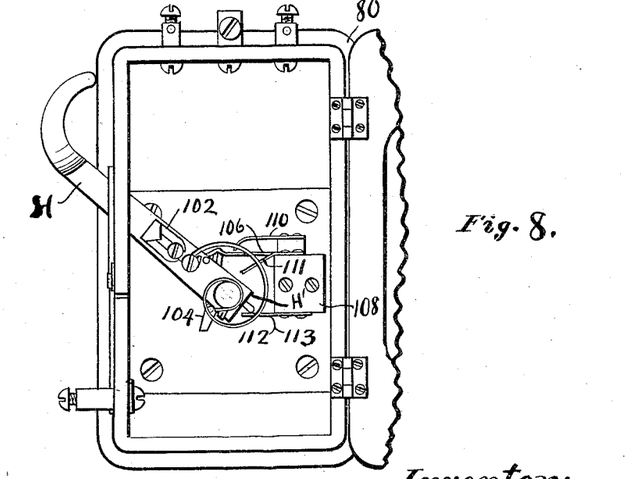
Fig. 8 is an interior view of said call-box.

In arranging the arms 41 they are located so that the first one to engage a rack is in the "1,000," series. The second is in the "900" series, and so on. It therefore follows that having set his crank 82 at "4" on the dial when he turned it to its normal position he made six contacts, which would be the sixth contact-making device or sixth rack from the end. Setting the crank 82 moves the arm 98 from contact-point 101 to contact-point 100. Removing the receiver returns the arm 98 to 101 by virtue of the block 102 engaging the pin 99. It therefore follows that in rotating the crank 82 from figure "4" to "0" the gear 85 turns the pinions 86 and 87, which in turn rotate the disks 88 and 89. The relation between the gear 85 and the pinions 86 and 87 is such that each pinion makes one complete rotation while the arm 82 is passing from one point on the dial to the next. The rotation of the disk 88 makes a series of contacts with the contact-spring 93, when the current flows as follows: from battery X, 120, 121, 122, 98, 101, 123, 93, 88, 124, 112, H, 125, 69, 126, 59, 71, 127, 67, 68, 128, B, 129, X. This energizes magnet B and rotates the selector-shaft 40, so that an arm 41 will select the proper rack 35, and consequently the proper contact-making device 33. When the magnet B is energized, the arm 82 passes between one of the pins of the dial and the next adjacent one until the arm reaches its normal position, as shown in Fig. 7. The preliminary movement beyond the normal position causes the arm 95 to engage the pin 99, so as to move the arm 98 from engagement with the contact-point 101 to the contact-point 100. Then the further movement of the arm 82, causing the rotation of the disk 89, sends a series of electric currents as follows: from battery X, 120, 121, 122, 98, 100, 130, 94, 89, 131, 110, 107, 132, 133, 134, 63, 64, 135, A, 136, 200, X. This energizes magnet A a series of times and moves the insulated contact-making devices up to the required contact-point 23. The contact-making device is therefore in connection with the required switch, as will become apparent in following through the subsequently-described ringing and talking circuits. To ring, the subscriber turns the crank of his generator G, when the current flows as follows: from G, 137, 138, Q, 139, 133, 134, 63, 64, 135, A, 136, 200 to 129 of the called switch, B, 128, 68, 67, 127, 71, 59, 126, 69, 125, H, 111, 138, Q, 139, 133, 134, 63, 62, 61, 140, 33, (which is connected to the particular line-wire in exchange 300,) then back on 300 to 301 of the calling-switch, 23, 33, 140, 61, 66, 67, 127, 71, 59, 126, 69, 125, H, 112, 124, 88, 92, 141, 142, 143, G. This calls the subscriber, who removes his receiver. The primary circuit then flows from battery Y, 144, 113, H, 145, K, 146, T, Y. Beginning at calling-switch, the secondary circuit will be as follows: K, 147, R, 148, 149, 142, 141, 92, 88, 124, 112, H, 125, 69, 126, 59, 71, 127, 67, 66, 61, 140, 33, to selected point 23, 301, 300 to 140 of the called switch, 61, 62, 63, 134, 133, 150, K, 147, R, 148, 149, 142, 141, 92, 88, 124, 112, H, 125, 69, 126, 59, 71, 127, 67, 68, 128, B, 129, 200, back to 136 of the calling-switch, A, 135, 64, 63, 134, 133, 150, K. Hanging up the receiver breaks the connection between H and 112 and between H and 113 and also breaks the connection between 107 and 110. It also makes connection between 106 and 107 through 104 and also connects H to 111. Closing the connection between 106 and 107 causes a current to flow as follows: X, 120, 121, 106, 107, 132, 133, 134, 63, 64, 135, A, 136, 200, X. The operation of the magnet A causes the insulated piece 69 to engage the spring-contact 70, when a second and simultaneous current flows as follows: X, 120, 121, 106, 104, H, 125, 69, 70, 151, 128, B, 129, 200, X. This simultaneous operation of magnets A and B releases the ratchet-wheel 42, so as to permit the shaft 41 to return to its normal position, thereby releasing the arm 41 from the moved rack 35. As will be observed by inspection of Fig. 3, the racks are set at an inclination so that when they are not pressed against their gears 27 by means of the arms 41 they fall away by gravity from such engagement, and gravity also permits them to fall back to their normal position. The return of the shaft 40 to its normal position is effected by means of a small clock-spring. (Shown at 240 in Fig. 1.)

If we assume that the subscriber whose telephone and switch are illustrated in Fig. 16 has called the one illustrated in Fig. 18, then if the subscriber at telephone illustrated in Fig. 17 should also move his switch to electrical connection with the switch shown in Fig. 18 at the instant when his contact-making device 33 touches the contact-point 23, which is connected to the particular wire 300 for subscriber of switch shown in Fig. 18, there will be an electric circuit as follows: from battery Z, 250, 251 of the switch shown in Fig. 17, C, 252, 58, 60, 140, 33, selected 23, 301, 300, to 140 of the switch shown in Fig. 18, (also 301 of the switch shown in Fig. 16,) 61, 62, 63, 134, 133, 150, K, 147, R, 148, 149, 142, 141, 92, 88, 124, 112, H, 125, 69, 126, 59, 71, 127, 67, 68, 128, B, 129, 200, Z. If the receiver, which is of low resistance, is off of the hook belonging to the telephone shown in Fig. 18, then the battery Z is powerful enough to energize the magnet C; but if the receiver is on its hook then the circuit just described would pass through the high-resistance coil Q and would not affect the magnet C. Assuming, however, that the receiver is removed and this circuit is complete, as stated, then the simultaneous operation of the magnet C and the magnet A will cause the lever 59 to be caught under the hook of armature-lever 58, thereby breaking the connection between 59 and 71 of the person who is a second one to move to electrical connection with the particular switch. As connection between 59 and 71 is in both the ringing and the talking circuits, it will therefore be evident that the subscriber at the telephone illustrated in Fig. 17 cannot make connection to the one in Fig. 18 while the latter is talking. As, however, the connection between 59 and 71 is not in the operating-circuit, the fact that 59 has been caught under 58 will not affect or prevent the subscriber from moving his switch beyond connection to one who is talking. In other words, the magnet C operates to prevent interference with talking subscribers, but in no other way interferes with the operation of the switch. Assuming that subscriber of Fig. 17 has stopped his switch in connection with a busy line, then as soon as the circuit is broken through the magnet A the connection between 60 and 58 is broken, which is part of the electrical circuit going through the magnet C. Consequently the magnet C is demagnetized and its armature released. The release, however, does not permit 59 to come into contact with 71; but it does permit 59 to engage 58, when there is a circuit as follows: Z, 250, 251, C, 252, 58, 59, 126, 69, 125, H, 112, 124, 88, 92, 141, 142, 149, 148, R, 147, K, 150, 133, 134, 63, 64, 135, A, 136, 200, Z. This again energizes magnet C, which moves the armature-lever 59 and breaks its own connection. Breaking the connection demagnetizes the magnet C, when 59 again falls into connection with 58 and the current is repeated. It will therefore be apparent that if the subscriber at the telephone of Fig. 17 stops his switch into connection with a busy line his magnet C will make and break its circuit rapidly, the current of which circuit flows through his own receiver R. This causes a buzzing sound in the receiver and automatically indicates that the line is busy.

What I claim is—

1. The combination with a series of telephones and electrical connections extending therefrom, of a switching mechanism provided with a series of contact-points each one of which is a terminal for an electrical connection from a different telephone, a division of the contact-points into groups, an independently-movable contact-making device for each group, a propelling mechanism provided with a gear for each contact-making device, a separate rack connected to each contact-making device, and means for moving the racks independently to and from engagement with their respective gears.

2. The combination with a series of telephones and an electrical connection from each one of them, of a switching mechanism provided with a series of contact-points each one of which is a terminal of a connection from a different telephone, a division of said contact-points into groups, an independently-movable contact-making device for each group of contact-points, a propelling mechanism, a separate rack secured to each contact-making device, a separate guide for each rack and its connected contact-making device, and means for moving the racks independently to engagement with their respective gears, substantially as described.

3. A shaft provided with means for turning it, a series of gears mounted upon said shaft, a rack for each gear, said racks being normally disconnected from said gears, a second shaft provided with a series of radially-disposed arms so arranged that upon rotating said shaft the said arms will move said racks successively into engagement with their gears, and a magnet for rotating said second shaft.

4. The combination with a series of switching mechanisms and wires interconnecting them, of a telephone connected to each switching mechanism, means controlled from each telephone for operating its connected switching mechanism so as to move it from a normal position to electrical connection with any of the other switching mechanisms, a magnet as C arranged to break such electrical connection when the moved switching mechanism is stopped at connection with a switching mechanism in existing electrical connection with some third switching mechanism and means whereby upon breaking such connection said magnet C will return a busy signal to the connected telephone.

5. In an automatic telephone-exchange, the combination with a series of telephones, a switching mechanism for each telephone, and means for operating the switching mechanisms so as to establish a number of simultaneous talking-circuits or busy lines, of a magnet on each switching mechanism arranged to break its talking-circuit when such switching mechanism is moved to and stopped at connection with a busy line, and means whereby upon breaking such circuit said magnet will return a busy signal to the connected telephone.

Signed at St. John, Kansas, this 3d day of April, 1900.

N. EMEL NORSTROM.

Witnesses:
 PAUL R. NAGLE,
 CLARENCE ANDERSON.